US 8,009,602 B2

(12) United States Patent
Hui et al.

(10) Patent No.: US 8,009,602 B2
(45) Date of Patent: *Aug. 30, 2011

(54) METHOD FOR LOW POWER RADIO OPERATION IN A WIRELESS PACKET NETWORK

(75) Inventors: Jonathan W Hui, Berkeley, CA (US); David E Culler, Berkeley, CA (US)

(73) Assignee: Cisco Technology, Inc., San Jose, CA (US)

(*) Notice: Subject to any disclaimer, the term of this patent is extended or adjusted under 35 U.S.C. 154(b) by 198 days.

This patent is subject to a terminal disclaimer.

(21) Appl. No.: 12/380,590

(22) Filed: Feb. 27, 2009

(65) Prior Publication Data

US 2009/0279465 A1 Nov. 12, 2009

Related U.S. Application Data

(63) Continuation of application No. 11/411,404, filed on Apr. 25, 2006, now Pat. No. 7,515,556.

(51) Int. Cl.
*G08C 17/00* (2006.01)
(52) U.S. Cl. ............... 370/311; 455/343.2; 455/343.4; 455/574; 370/318
(58) Field of Classification Search ............ 455/127.5, 455/343.1–343.6, 522, 572–574, 127.1, 500, 455/502, 507, 515, 516; 370/241, 311, 328, 370/329, 310, 318, 338, 346–348, 445, 448, 370/449; 713/320, 321, 323, 324; 340/7.32–7.34, 340/7.36, 7.37
See application file for complete search history.

(56) References Cited

U.S. PATENT DOCUMENTS

| | | | |
|---|---|---|---|
| 5,805,990 A | 9/1998 | Ohki | |
| 6,084,888 A | 7/2000 | Watanabe et al. | |
| 6,563,427 B2 | 5/2003 | Bero et al. | |
| 6,819,908 B2 | 11/2004 | Spratt | |
| 6,889,067 B2 | 5/2005 | Willey | |
| 6,959,013 B1 | 10/2005 | Muller et al. | |
| 6,980,823 B2* | 12/2005 | Challa et al. | 455/522 |
| 7,164,885 B2 | 1/2007 | Jonsson et al. | |
| 7,260,068 B2 | 8/2007 | Hsieh et al. | |
| 7,489,674 B2* | 2/2009 | Kim | 370/348 |
| 7,515,556 B2 | 4/2009 | Hui et al. | |
| 7,594,126 B2* | 9/2009 | Yun et al. | 713/300 |
| 7,738,413 B2* | 6/2010 | Varaiya et al. | 370/321 |
| 7,830,838 B2* | 11/2010 | Kohvakka et al. | 370/330 |
| 2002/0176391 A1 | 11/2002 | Hermann et al. | |
| 2002/0196769 A1* | 12/2002 | Ohmi et al. | 370/343 |
| 2003/0144042 A1* | 7/2003 | Weinfield et al. | 455/574 |
| 2003/0198196 A1 | 10/2003 | Bahl et al. | |
| 2004/0218556 A1 | 11/2004 | Son et al. | |
| 2004/0246983 A1 | 12/2004 | Kaatz | |
| 2004/0264396 A1 | 12/2004 | Ginzburg et al. | |
| 2007/0242634 A1* | 10/2007 | Calcev et al. | 370/318 |

OTHER PUBLICATIONS

Written Opinion of the International Searching Authority from International Application No. PCT/US07/10005, mailed Sep. 15, 2008, 6 pages.

(Continued)

*Primary Examiner* — Anthony Addy
(74) *Attorney, Agent, or Firm* — Fish & Richardson P.C.

(57) ABSTRACT

A system and method allows devices to send and receive packets while using power to do so to the extent needed, thereby conserving power.

17 Claims, 4 Drawing Sheets

OTHER PUBLICATIONS

International Search Report from International Application No. PCT/US07/10005, mailed Sep. 15, 2008, 3 pages.

Notice of Allowance mailed Oct. 8, 2008 in U.S. Appl. No. 11/411,404, 12 pages.

Non-final Office Action mailed Nov. 5, 2010 in U.S. Appl. No. 12/004,125, 10 pages.

Non-final Office Action mailed Dec. 23, 2010 in U.S. Appl. No. 12/004,321, 12 pages.

Non-final Office Action mailed Oct. 14, 2008 in U.S. Appl. No. 11/516,841, 18 pages.

Final Office Action mailed Mar. 31, 2009 in U.S. Appl. No. 11/516,841, 21 pages.

Non-final Office Action from U.S. Appl. No. 12/004,140, mailed Feb. 25, 2011, 9 pages.

* cited by examiner

METHOD FOR LOW POWER RADIO OPERATION IN A WIRELESS PACKET NETWORK

CROSS REFERENCE TO RELATED APPLICATION

This application is a continuation of U.S. patent application Ser. No. 11/411,404 entitled "System and Method for Low Power Radio Operation in a Wireless Packet Network" filed by Jonathan W. Hui and Davic E. Culler on Apr. 25, 2006 now U.S. Pat. No.7,515,556, having the same inventors and assignee as the present invention and that application is hereby incorporated by reference herein in its entirety.

FIELD OF INVENTION

The present invention is related to computer software and more specifically to wireless networking computer software.

BACKGROUND OF THE INVENTION

Conventional motes are small electronic devices that sense at least an element of their surroundings and communicate information related to the element sensed. A mote may communicate just the information it has collected, or such information may be combined with that from other motes and communicated, for example, to a central device.

Conventional motes communicate with one another and/or a central device. If the device or other mote with which the mote wishes to communicate is out of range, the mote may communicate via a multi-hop communication through other motes.

Because motes may rely on a small source of stored power such as batteries, it can be desirable for a mote to conserve power. One way motes draw power is during receipt of transmissions. To keep a radio on all the time to receive any transmission can represent a substantial power drain on the mote's power supply.

One conventional way that power could be conserved is to divide the time into slots, and require the motes to leave their radios off, turning them on to listen only during some of the slots. The radios are off during other slots, conserving power. If the start of a transmission is received during one of the slots in which the mote is to be listening, the mote can keep the radio on until the entire transmission is received. A beacon is periodically transmitted to synchronize the clocks of the different motes. However, this arrangement is difficult to synchronize in a multi-hop environment.

Another way power has been conserved has been to require one mote that wishes to communicate with another, to transmit a repeating preamble that signifies that a message is forthcoming. The preamble is repeatedly transmitted throughout a period in which each device turns on their radio and listens for a preamble. If the device does not detect a preamble, it turns off its radio for one preamble period, thereby conserving power. If the device detects a preamble, the device keeps its radio on until the actual communication is received. Although this technique conserves power during periods in which no preamble is received, after the preamble is received, the device is required to keep its radio on until the actual message is received, wasting power while any subsequent preambles are repeatedly received and discarded.

Recently an IEEE communication standard known as 802.15.4 has been adopted by designers of communication products, and many conventional mote manufacturers would like to use the standard for inter-mote communication. However, the standard does not handle the conservation of power very well because it employs the preamble technique, with the problems described above. What is needed is a system and method that can use the facilities of an 802.15.4-compatible device, but can conserve power better than an arrangement in which the receipt of a preamble causes a receiving device to keep its radio on until the actual communication is received, and does not involve a time-division multiplexing arrangement.

SUMMARY OF INVENTION

A system and method optionally uses the 802.15.4 capabilities of a receiving device to identify whether there is power being received over the frequency or frequencies monitored by the radio, and optionally performs this function periodically, according to a chirp period agreed upon by the devices. If there is no power detected on the frequency, the system and method turns the radio off and waits until the next chirp period to start again. If power is detected on the frequency, (or, in the event that the above function is not performed) the system and method attempts to receive a packet and read a delimiter in the packet header or packet payload identifying the type of packet transmitted as a chirp packet. The system and method may instead attempt to receive a packet and identify whether it is a chirp packet periodically without first identifying the energy being received on the frequency or frequencies monitored by the radio. If a chirp packet is not identified, the system and method may attempt to determine whether the packet is a data packet, accepting it if it is, in spite of the fact that no chirp packet was received.

If a chirp packet or data packet is not identified in either of the above two approaches, the system and method turns the radio off and waits until the next chirp period to start again. If the chirp packet is identified, the system and method parses the chirp packet to identify a "time to data packet", which identifies an amount of time until the sending device will provide the data packet as measured from a point in time corresponding to the chirp packet.

The system and method then turns the receiving radio off for the amount of time corresponding to the packet, for example, the amount of time specified by the time to data packet contained in the packet, and then turns the receiving radio back on after the amount of time has elapsed. The system and method then receives the packet, if desired.

In one embodiment, other devices may, without sending another set of chirp packets, send their data packets soon after the data packet corresponding to the chirp packet has been received, and thus, even if a packet corresponding to the chirp packet is not desired by a certain device, that device might turn its radio on at the time the data packet is to be received, or at the time immediately after the data packet is to be received, in order to receive such additional piggybacked packets from other devices. The amount of time the receiving radios should remain on to receive such packets may be a fixed specified amount or it may be specified as part of the chirp packet.

The chirp packet optionally also contain an address, such as a destination address, which may be a 16 bit or 64 bit IEEE address or a broadcast address, a source address, a MAC address, any other form of an address, or no address at all to allow the receiving devices to determine whether to receive the data packet described by the chirp packet. The chirp packet may also optionally contain information relating to any or all of the size of the corresponding data packet, the length of the transmission time of the corresponding data packet, (which may be provided in seconds or other units), the number of packets to be received, whether the device transmitting the corresponding data packet will listen for data packets that are sent by other devices rapidly following the data packet or packets it sends, and other information enabling the transmitting or receiving devices to operate efficiently, for example, by leaving their radios off not only until the data packet or packets arrive, but until the data packet or packets are sent, to avoid receiving data packets not desired.

DETAILED DESCRIPTION OF A PREFERRED EMBODIMENT

Figure 1:
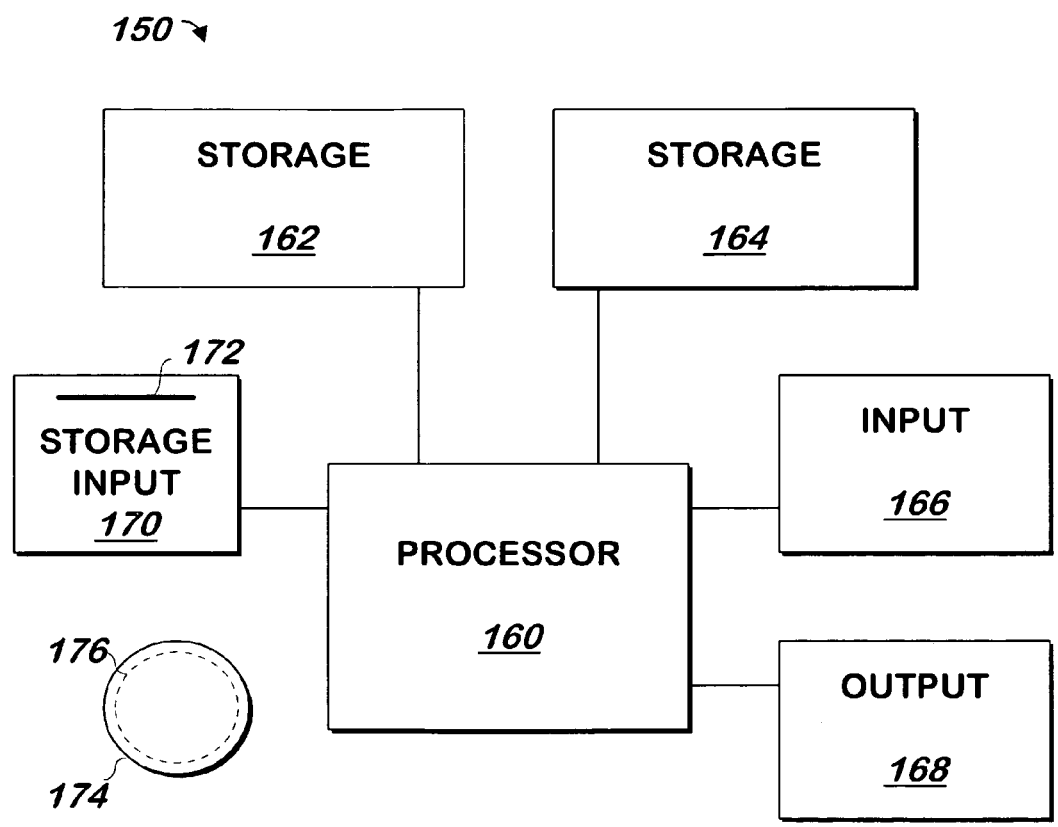
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard, buttons or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the Linux operating system commercially available from the Web site of Linux.org, the BSD operating system available from the Web site of freebsd.org, or the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used. In one embodiment, systems may be based on the conventional MSP430 commercially available from Texas Instruments, Inc., of Dallas, Tex., or the atmega128 commercially available from Atmel Corporation, of San Jose, Calif., or the PXA xscale commercially available from Intel Corporation of Santa Clara, Calif. Such systems may run the conventional TinyOS, commercially available from the web site of SourceForge.net or another operating system, such as a real time operating system.

Figure 2A:
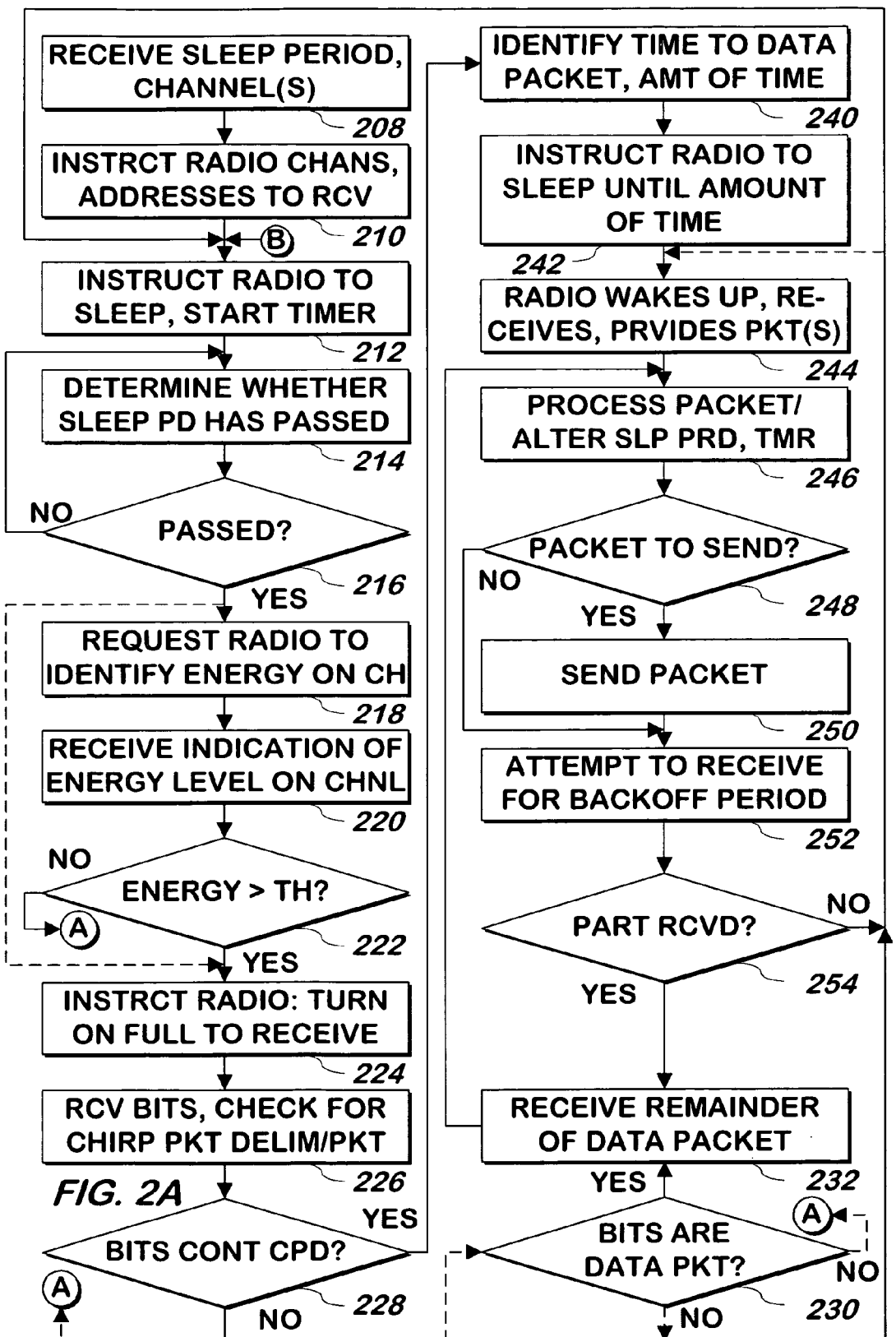
FIG. 2, consisting of FIGS. 2A and 2B, is a flowchart illustrating a method of receiving and sending packets in a manner that conserves power according to one embodiment of the present invention.
Figure 2B:
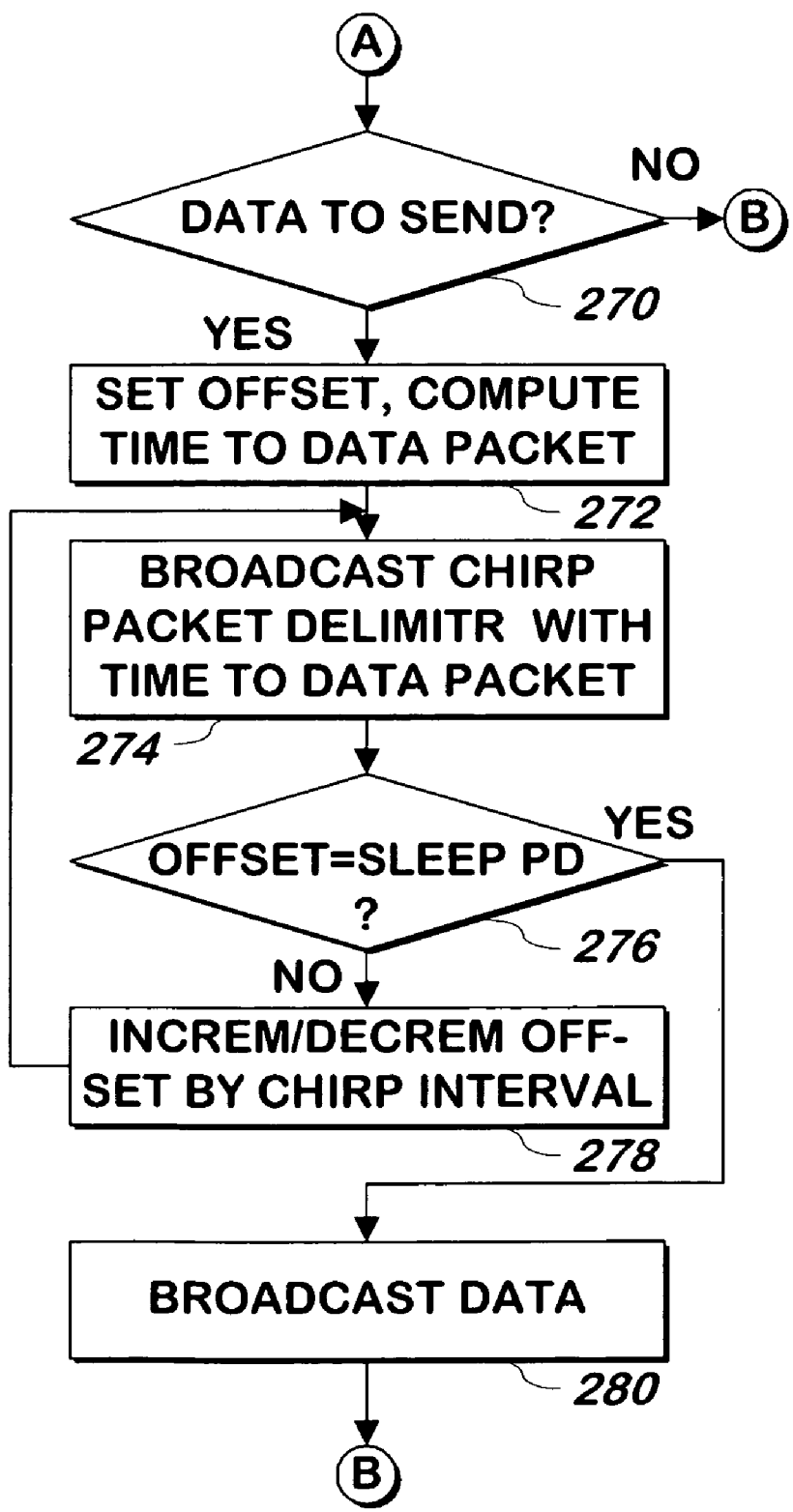

FIG. 2, consisting of FIGS. 2A and 2B, is a flowchart illustrating a method of receiving and sending packets in a manner that conserves power according to one embodiment of the present invention. The method may be implemented in an 802.15.4-compatible device or any other device.

Provide Sleep Period, Channel(s), Address(es)

Referring to FIG. 2A of FIG. 2, a sleep period and channel information are received 208. The sleep period is a length of time, having the same value among devices, during the span of which each device must awaken at least once, to either gauge the energy on the channel or listen for a chirp packet as described in more detail below. The channel information may include the one or more frequencies over which the device communicates with other devices and may optionally indicate a multicast or other address corresponding to communications that should be received. Such other address may be a short address, a MAC address or any other form of address. More than one address or more than one type of address may be received. It is not necessary that the channel information include an address at all, as communications containing all addresses or no addresses may be received. Channel information may include a number of frequencies, which may be scanned.

To provide the sleep period and channel information, an administrator may enter the information manually or it may be received from a device such as a ROM or it may be received via the radio or a serial port, or in any other conventional manner.

Instruct Radio which Channels to Monitor and which Addresses to Receive

The radio of a device implementing the method is instructed 210 which frequencies to monitor and which addresses to receive communications using the information received in step 208. In one embodiment, the radio may be instructed to receive communications for one or more addresses specific to itself, and/or for one or more multicast addresses, or, as noted above, no addresses may be specified and the radio will receive communications addressed to any address or no address. In one embodiment, the radio is a conventional IEEE 802.15.x-compatible radio that provides some or all of the capabilities described by one or more 802.15.x specifications. The radio transmits and receives data over a wireless network, though wired networks may also be used. Other radios and/or protocols may be used, such as the conventional 802.11a/b/g/h or other similar protocols.

Instruct Radio to Sleep and Start Timer

At step 212, the radio, and optionally other devices, are instructed to enter sleep mode, a timer is started or an interrupt is set to allow the detection of the end of the sleep period received at step 208, and the method continues at step 214. When such instruction is received, the radio and/or other devices enter sleep mode. To enter into sleep mode, the radio decreases power or stops performing one or more operations or powers down completely or nearly completely. As a result, energy provided to, and used by, the radio is decreased as compared with the energy used when the radio is capable of receiving packets or other communications as described herein. Additionally, in one embodiment, a processor and/or other circuitry may also power down during the sleep period.

Determine Whether Sleep Period has Passed

A determination is made whether the sleep period received at step 208 has passed 214. To determine whether the sleep period has passed, the status of the timer may be checked. In one embodiment, if the timer has reached zero, it is determined that a sleep period has passed; otherwise, if the timer has not reached zero, it is determined that the sleep period has not yet passed. Alternatively, the timer may count forward, instead of backwards, until the sleep period has passed. In another embodiment, the determination of the sleep period passing may be made when a timer interrupt is generated by an operating system, such timer interrupt being set as a part of step 212.

If it is determined that the sleep period has not yet passed 216, then the method may continue to check the status of the timer at step 214, in order to determine when the sleep period has ended, or step 214 waits until the timer interrupt is received by the operating system.

Request Radio to Identify Energy on the Frequency Corresponding to the Channel

When the sleep period has passed 216, the radio is optionally requested to identify energy on the frequency or frequencies, 218, and in another embodiment, indicated by the dashed line in the Figure, step 224 follows the "yes" branch of step 216, and steps 218-222 are not performed. In one embodiment, the radio used to wirelessly communicate packets or other information as described herein has two or more power levels that can be selected. At a lowest power level, referred to as full sleep mode, the power consumed by the radio is less than the power required to monitor energy on the frequency or frequencies, and lower than the amount of power to receive bits over that frequency or those frequencies. At the highest power level, the radio can receive bits over the frequency. The activity of identifying energy on the frequency may be performed at either of those power levels or at a third power level between them. In the case of the third power level, it is higher than full sleep mode but lower than the energy required to receive bits. In another embodiment, the radio only has two power levels, such as "on" and "sleep".

To request the radio to identify energy on the frequency, the radio is provided with sufficient power to emerge from full sleep mode and identify the energy on the frequency.

Receive Indication of Energy Level on Channel

An indication of the energy level on the frequency or frequencies may be received 220. In one embodiment, to receive an indication of the energy level on the frequency or frequencies, the radio is requested to provide a numerical energy level indicator.

If the energy level does not exceed a threshold 222, the method continues at step 270 of FIG. 2B. The threshold may be a pre-programmed number or it may be received as part of step 208. The threshold may be changed or adapted according to the specific environment or sensitivity setting of the radio. For example, if energy is detected on the frequency or frequencies far more often than chirp packets are detected and received as described below, the threshold may be raised, and if chirp packets are almost always detected and received as described below after energy on the frequency or frequencies is detected, the threshold may be lowered to keep the relative number of times that chirp packets are detected to the times that energy is detected within an acceptable range.

Data to Receive:

Instruct Radio to Turn on Full

Either if the energy level on one or more frequencies exceeds the threshold 222, or, in the embodiment in which step 224 follows the "yes" branch of step 216, the radio is instructed to turn on fully to attempt to receive bits 224. As will be described in more detail below, the radio may be turned off again to conserve power once a sufficient number of bits have been received.

Receive Packet and Check for Chirp Packet Delimiter

If bits are received, the bits are scanned as they are received to attempt to identify a start frame delimiter, a chirp packet delimiter or both that can be used to identify a chirp packet 226. A start frame delimiter is a recognizable pattern of bits that is provided before any packet or set of packets, and may be referred to as a frame start delimiter or FSD. A chirp packet delimiter may be a series of bits in the header portion of a packet that also form a recognizable pattern that indicate the packet is a chirp packet (as opposed to, for example, a data packet), and may be different or the same as the start frame delimiter. Each chirp packet delimiter will be the same for every chirp packet sent. Other bits in the chirp packet includes a "time to data packet", described in more detail below, as well as other optional information described herein.

In one embodiment, the radio will only be turned on long enough to receive a limited number of bits, such as the smallest number of bits that will always detect a chirp packet if the packet is being received by the radio. There are many approaches to the amount of time the radio remains on, and the present invention may use any such approach. In one embodiment, the amount of time the radio will remain on to receive bits, if any, in step 226 may be the amount of time that would be required, either under a reasonable worst case scenario or under the currently applicable bit rate, to receive a number of bits in a standard chirp packet, plus the number of bits in a start frame delimiter that precedes any packet. In another embodiment, the amount of time, either under a reasonable worst case scenario or under the currently applicable bit rate, that it would take to receive a small number of bits more than the number of bits in a chirp packet, plus the number of bits in the start frame delimiter. In still another embodiment, the amount of time is the amount of time, either under a reasonable worst case scenario or under the currently applicable bit rate, to receive one bit less than the number of bits in two full chirp packets plus the number of bits in a start frame delimiter to ensure that if a chirp packet is present, and chirp packets are being broadcast one after the other, one entire chirp packet is received. The reasonable worst case scenario may apply when bit rates are reduced in response to certain conditions, for example, high error rates. A reasonable worst case scenario may be the lowest possible bit rate or one that is one level higher. If it is possible to identify the currently applicable bit rate, the amount of time may be adjusted in accordance with that bit rate. It may be the case that the currently applicable bit rate cannot be determined with certainty, for example, because it may drop during receipt, in which case the reasonable worst case scenario might be one bit rate lower than the currently applicable bit rate.

If no chirp packet delimiter is identified 228, the method continues at step 212. In another embodiment, as the bits are scanned in step 226, a determination is made as to whether the bits correspond to a data packet or part of a data packet. In one embodiment, a data packet is a packet other than a chirp packet. If the chirp packet delimiter is not identified in the received bits 228, as indicated by the dashed line in the Figure, if the bits correspond to a data packet or the start of a data packet 230, any remainder of the packet is received from the radio 232 and the method continues at step 246. A data packet may be identified if a start frame delimiter is detected, but a chirp packet delimiter is not detected in the position in which it would appear in a chirp packet, for example, relative to the start frame delimiter. In one embodiment, a start frame delimiter is a recognizable pattern that is provided before any packet: data packet or chirp packet. If the bits correspond to neither a chirp packet or a data packet 230, e.g. because no start frame delimiter is detected, the method continues at step 212.

Identify Time to Data Packet

If the chirp packet delimiter is identified 228 in the stream of bits, the "time to data packet" is identified 240 in chirp packet and a length of time corresponding to this time is identified. To identify the "time to data packet", the chirp packet is processed or parsed. The bits received may include parts of two data packets, provided by the sender of the data packets in the same manner as described below with respect to FIG. 2B. In one embodiment, the time to data packet may be taken from either such part of a packet, or if the time to data was itself split into to two portions in each data packet, it may be inferred from both portions. If necessary, the length of time may be identified by adjusting the time to data packet to accommodate the delay required to receive and process the chirp packet, and the adjustment may factor the portion of the chirp packet or packets containing the time to data received to factor in the amount of time since the packet or the start frame delimiter for that packet was received.

In one embodiment, the "time to data packet" in any chirp packet is the amount of time, from the start of the packet, start of the start frame delimiter, or the end of the chirp packet, that should be allowed to pass (with the receiving radio set to sleep, turned off, or running on reduced power, if power conservation is desired) before the broadcast of the actual data packet. The time to data packet may be measured in conventional time units or it may also be measured in chirp intervals, which is the length of time it takes to broadcast one chirp packet, including the start frame delimiter.

In one embodiment, the chirp packet may also specify a length of the expected transmission time of the data packet or packets, or the size of the data packet or total size of all data packets to be received. In one embodiment, the chirp packet may include the number of data packets to be received. Any or all such information is identified as part of step 240 from the chirp packet or packets received. This information allows a receiving device that does not wish to receive the data packets sent by the device that sent the chirp packet to keep its radio off not only for the amount of time corresponding to the time to data packet, but also to keep its radio off during the transmission of the data packet or packets from the device that sent the chirp packet. Such information can reduce collisions from communications sent by other devices with subsequent packets the device that sent the chirp packet intends to send following the data packet that will be sent at or around the time to data packet. In one embodiment, the amount of time the radio will sleep, identified in step 242, not only is determined by the time to data packet contained in the chirp packet received, but also by whether the data packet or packets are to be received, with the amount of time corresponding to the data packets, or a time corresponding to this time, being added to the amount of time if data packet or packets sent by the sender of the chirp packet are not to be received.

Instruct Radio to Sleep Until Time to Data Packet

The radio is instructed to enter energy-conserving sleep mode until the amount of time identified as described above is reached 242. To determine when the amount of time has been reached, in one embodiment, the timer is monitored, for example, by using an internal timer or interrupt or any method similar to the monitoring of the sleep period as described above, until the time to data packet is reached, at which point the radio is instructed to awaken. In another embodiment, the radio itself contains a timer and the command provided to the radio to instruct the radio to enter sleep mode contains the amount of time, to allow the radio to wake itself at that time.

Radio Wakes Up and Receives and/or Broadcasts Packet(s)

The radio is fully awakened after the amount of time has passed and one or more data packets are received and/or provided 244. To fully awaken the radio and receive one or more data packets, in one embodiment, the radio is signaled to apply full power to receive a data packet or packets being broadcast by devices operating on the channel or channels specified as described above.

Process Packet

The one or more data packets received in step 244 are processed 246. To process a received data packet, the header portion and/or payload portion of the one or more packets are parsed and processed in any conventional manner. In one embodiment, processing a packet involves providing the payload of the packet to a storage device or a different process that interprets the information contained therein or forwards it to another device.

No Packet to Send: Wait for Piggybacked Packets and then Enter Sleep Mode

In one embodiment, a data packet may be broadcast, as described below, shortly or immediately after the time a data packet is received to take advantage of fully awakened and receptive radios monitoring the channel. As described in more detail below, other devices monitoring the channel may attempt to provide one or more data packets following the receipt of the data packet described by in the chirp packet, without providing a separate chirp packet or waiting for a sleep period. Such a packet or packets may be provided by the device that sent the chirp packet or by any other device. If more than one device attempts such a broadcast at the same time, conventional network collision detection and back-off techniques may be used. In one embodiment, receiving devices will keep their radios on for slightly longer than the maximum back off period following the receipt of the packet described in the chirp packet or any other data packet received in an attempt to receive such piggybacked data packets from other devices or the same device. Other embodiments may use other periods shorter or longer than the maximum back off period, which may be received as part of step 208. In other embodiments, the chirp packet includes the period and such period is used. In such embodiment, step 240 includes identifying the period within the chirp packet and storing the period for use as described herein.

If the receiving device does not have a packet to send in this piggybacked fashion 248, the method continues at step 252.

Send Packet

If the receiving device has a packet to be sent 248 over the same channel, that packet is sent 250, and the method continues at step 252. In one embodiment, the packet is sent while the radios communicating on the same channel(s) as the newly received data packet are fully powered and prepared to receive one or more packets. As noted, conventional collision detection and back off techniques may be used to broadcast packets as part of step 250.

At step 252, an attempt is made to receive at least a part of a piggybacked packet before the maximum back off period has elapsed since the last data packet was received. If a data packet is received 254, any remainder of the packet is received 232 and the method continues at step 246. Thus, once a time to data packet has elapsed and the data packet corresponding to the chirp packet has been provided, data packets may be received from the same device as the device that sent the chirp packet or any other device, and any such sending device may send any number of packets.

Data to Send:

Set Offset=0

In one embodiment, any device may initiate the sending of one or more data packets by preceding them with a series of chirp packets as described above. In one embodiment, such data packets may be received for transmission from another process that generates them. Any such packets are provided as will now be described if there is no activity on the frequency or no data packet is received or both, as described above.

As noted above in step 218-222, the energy level on the frequency may be optionally checked to determine if it exceeds a threshold, and if the energy level does exceed the threshold 222, the method continues as described above. However, if the energy level does not exceed the threshold 222, then the method continues at step 270 of FIG. 2B. In the embodiment in which steps 218-222 are not performed (or even if they are), the "no" branch of step 230 or step 228 continues at step 270 of FIG. 2B instead of step 212 as shown by the dashed lines in the Figure.

At step 270, a determination is made whether a data packet is to be sent. In one embodiment, the steps for checking for data packets to broadcast may happen concurrently with and independently of the steps for checking for data packets to receive, or the steps may be performed in a sequence, as in this example. If no data packet is to be sent 270, then the method continues at step 212 of FIG. 2A. If a data packet is to be sent 270, then an offset time variable is initialized 272. As described herein, the offset time variable is initialized to zero, subtracted from the sleep period and the result is broadcast in the first chirp packet as the "time to data packet". The offset time variable is increased for each chirp packet as described in more detail below until the offset time variable reaches or exceeds the sleep period as described in more detail below, at which time the data packet is broadcast. Other embodiments may use a number of chirp packets (counted up or down) or other information that provides at least an approximate time that the data packet will be provided, instead of amounts of time, as the "time to data packet".

Broadcast Chirp Packet with Time to Data Packet

A chirp packet is wirelessly broadcast 274 with a chirp packet delimiter and a time to data packet equal to the sleep period received in step 208 minus the current value of the offset variable, or other time to data packet identified in step 272. To broadcast the chirp packet, a start frame delimiter is broadcast, followed by a chirp packet containing the chirp packet delimiter, described above, and a time to data packet. In one embodiment, the period during which radios should remain on after receiving the data packet or the last data packet or piggybacked packet in order to receive any piggybacked packet or additional piggybacked packet is also broadcast with the chirp packet.

Increment Offset by One Chirp Interval

If the offset variable is not equal to or greater than the sleep period (or the number of packets in the sleep period or is not equal to or less than zero) 276, then the offset variable is incremented (or decremented in other embodiments) by one or by the amount of time it takes to broadcast one chirp packet, including the starter frame delimiter, and the method continues at step 274.

Broadcast Data

If the offset time variable is greater than or equal to the sleep period (or less than or equal to zero) 276, one or more data packets are broadcast 280 wirelessly via the radio, and the method continues at step 212 of FIG. 2A. In one embodiment, the offset time variable is greater than or equal to the length of the sleep period (or less than or equal to zero) when or after the broadcast time to data packet is reached; thus, the data packets are broadcast as advertised in the chirp packet, or slightly afterwards.

In one embodiment, as described above, the chirp packet not only contains the information described above, it also contains the size of the data packet or data packets that will be broadcast or the amount of time it will take to broadcast the packet or packets. This allows devices that do not wish to receive the packet advertised in the chirp packet to delay powering up radios to receive other piggybacked packets until the advertised data packet has been sent.

System

Figure 3:
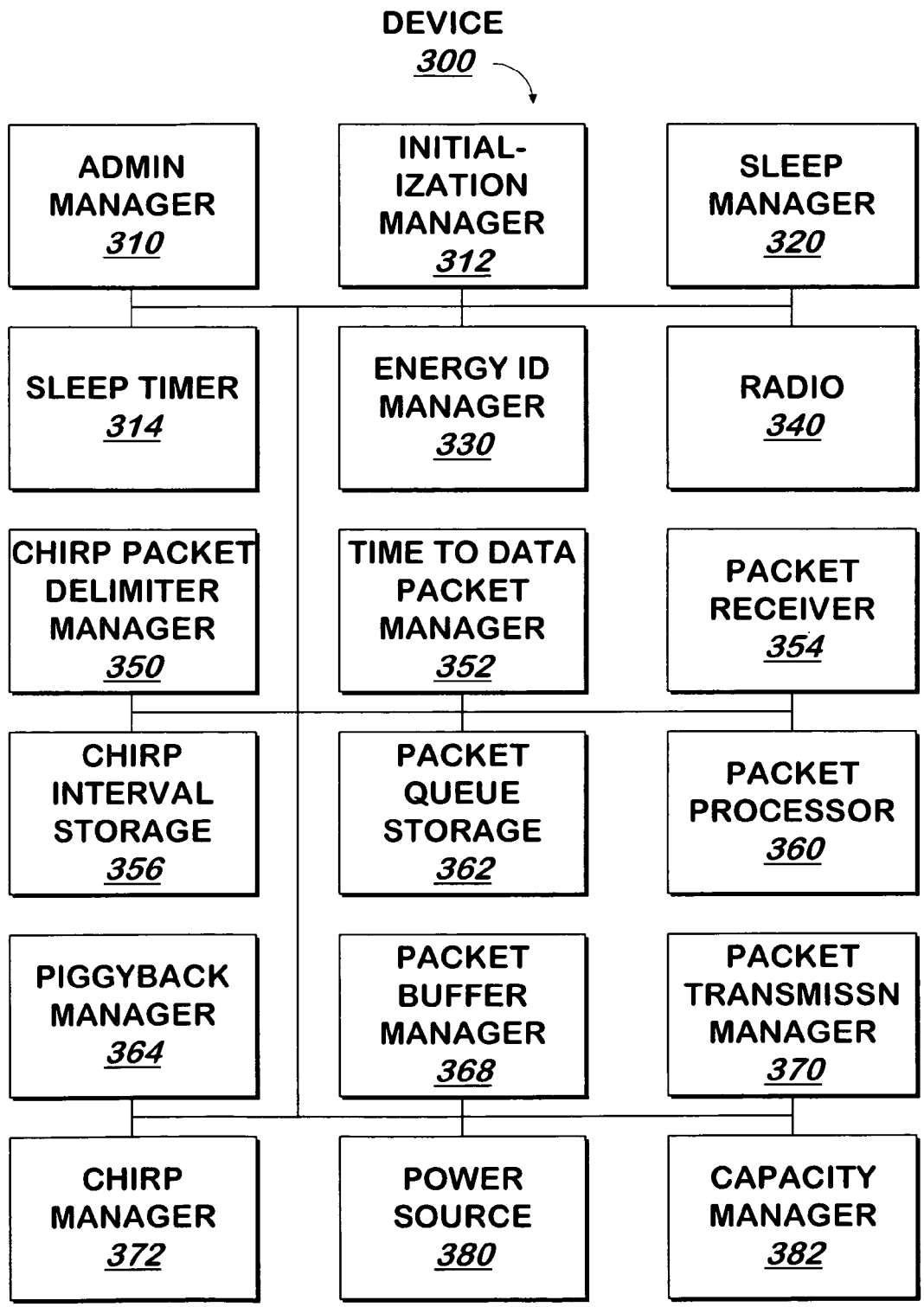
FIG. 3 is a block schematic diagram of a system for receiving and sending packets in a manner that conserves power according to one embodiment of the present invention.

FIG. 3 is a block schematic diagram of a system for receiving and sending packets in a manner that conserves power according to one embodiment of the present invention. Referring now to FIG. 3, administration manager 310 receives sleep period information, frequency information and optionally, address information and the period during which the radio should remain on following receipt of a data packet (the "piggyback period"), as described above. Administration manager 310 provides the sleep period, frequency or frequencies and any address or addresses and the piggyback period to initialization manager 312. In one embodiment, administration manager 310 receives sleep period information, frequency information and any address information and piggyback period, as described above, through any conventional means, such as via a ROM, or from a system administrator via a user interface or via a radio or serial port, using any conventional technique.

When initialization manager 312 receives the sleep period, frequency information and any address information from administration manager 310, it initializes the frequency and optionally, the address settings of radio 340 to instruct radio 340 to receive communications at the proper frequency or frequencies and addresses, as described above, and initialization manager 312 provides the sleep period to sleep manager 320.

Radio 340 is a conventional wireless radio capable of transmission and reception of bits or packets. In one embodiment, radio 340 is a conventional ChipCon CC2420 commercially available from ChipCon, of Oslo, Norway, and details of the CC2420 are available at the web site of chipcon.com/index.cfm?kat_id=2&subkat_id=12&dok_id=115. Other embodiments may use the conventional MC13203 commercially available from Freescale, Inc, of Austin Tex. or other conventional radios. Radio 340 uses the frequency and any addresses it receives to receive packets over that frequency, and optionally addressed to that address. As noted, an address is not necessary, as radio 340 may receive any packet from the frequency if desired.

When sleep manager 320 receives the sleep period from initialization manager 312, it stores the sleep period internally, instructs radio 340 to enter sleep mode, and initiates sleep timer 314 to the length of the sleep period. As described herein, sleep timer 314 is a timer monitored by sleep manager 320. However, in other embodiments, sleep timer 314 may be a timer that is monitored by radio 340, or sleep timer 314 may be a conventional timer built into and monitored by the operating system (not shown). In such embodiment, operating system may provide an interrupt to sleep manager 320, radio 340 or both when the amount of time received, has elapsed.

Sleep manager 330 monitors sleep timer 314, as described above, until the sleep period has elapsed. When sleep manager 320 determines that the sleep period has elapsed, sleep manager 320 may signal energy identification manager 330. In another embodiment, instead of signaling energy identification manager 330, sleep manager 320 may signal radio 340 to power on, as described in more detail below. In such embodiment, energy identification manager 330 need not be used.

In the embodiment in which energy identification manager is used, when energy identification manager 330 receives a signal from sleep manager 320, it receives an indication of the energy on the frequency. In one embodiment, to receive the indication of energy on the frequency, energy identification manager 330 requests radio 340 to turn on and identify energy on the frequency. (In another embodiment, sleep manager 320 turns radio on and energy identification manager requests radio to identify energy on the frequency one of the frequencies or any of the frequencies.) In one embodiment, the power required by the radio to accomplish this task is lower than the power required to receive a minimum length packet and in another embodiment, the amount of power is similar or the same as that required to receive a minimum length packet such as a chirp packet. In either case, it is higher than the sleep mode of the radio. In one embodiment, the sleep mode of the radio causes it to draw more power than it would if it were powered down or turned off, and in another embodiment, the sleep mode turns the radio off.

If energy identification manager 330 receives an energy level indication from radio 340 above a certain threshold, as described above, it signals radio 340 to fully awaken, if it is not already fully awake, and receive a stream of bits.

When radio 340 receives a signal to receive, it turns on to full power, if it is not already at full power, and attempts to receives a stream of bits as described above. If radio 340 receives any bits, it streams the bits to chirp packet delimiter manager 350. If radio 340 does not receive any bits, radio 340 so indicates to chirp packet delimiter manager 350.

When chirp packet delimiter manager 350 receives the stream of bits or the indication, it determines whether the stream of bits includes a chirp packet delimiter, as described above. In another embodiment, radio 340 itself may scan for the chirp packet delimiter. In one embodiment, either chirp packet delimiter manager 350 or radio 340 also scans for a starter frame delimiter.

If chirp packet delimiter manager 350, or radio 340, does not identify a chirp packet delimiter, or chirp packet delimiter and starter frame delimiter, or if the radio indicates that no bits were received, chirp packet delimiter manager 350 or radio 340 signals sleep manager 320 to instruct the radio to sleep for the sleep period, as described above, and sleep manager 320 complies, as described above.

As noted above, the stream of bits may in fact be a data packet. In one embodiment, chirp packet delimiter manager 350 may check for such a data packet as described above. If at least some of the data packet is identified, chirp packet delimiter manager 350 may receive the remainder of the packet, if any, and provide the data packet to packet receiver 354 for storage and use as described below.

If chirp packet delimiter manager 350 or radio 340 does identify a chirp packet delimiter in the stream of bits, it sends the stream of bits to time to data packet manager 352.

When time to data packet manager 352 receives the stream of bits from chirp packet delimiter manager 350, it identifies the time to data packet and determines the amount of time at which the radio should be turned on as described above, and optionally identifies the piggyback period as well. When time to data packet manager 352 has identified the amount of time at which the radio should be turned on, and optionally, the piggyback period, it signals sleep manager 320 with the amount of time, as described above. As noted, the time to data packet may describe a number of chirp packets remaining to be broadcast or another such number from which the amount of time remaining until the data packet can be derived. In such embodiment, time to data packet manager 352 performs such derivation to identify an actual time, and provides this time to sleep manager 320.

When sleep manager 320 is signaled with the amount of time at which the radio should be turned on, it instructs radio 340 to sleep until the amount of time has been reached. In one embodiment, sleep manager 320 instructs radio 340 to sleep, initiates sleep timer 314 to the time to data packet and monitors, or receives an interrupt from, sleep timer 314 until the time to data packet has been reached, as described above. When the time to data packet has been reached, sleep manager 320 signals packet receiver 354 to begin receiving the data packet or data packets.

When packet receiver 354 receives a signal from sleep manager 320, it retrieves the current date and time, and attempts to receive one or more data packets from radio 340. In one embodiment, packet receiver 354 attempts to receive one or more data packets by instructing radio 340 to wake up to full power, receive one or more data packets, and provide the data packet(s) to packet receiver 354. Radio 340 complies with such instruction. If packet receiver 354 has not received any data packets, packet receiver 354 signals piggyback manager 364 with the date and time it woke the radio up. If packet receiver 354 has received one or more data packets from radio 340, it retrieves the current date and time, provides the data packet or packets to packet processor 360 and signals piggyback manager 364 with an indication as to whether any packets were received, optionally, with the date and time it received the data packet. In one embodiment, packet receiver 354 will only provide the date and time for the first packet received from sleep manager 320, in which case there is only one piggyback period after the sleep period ends, and in another embodiment, there may be any number of piggyback periods until no more piggybacked packets are sent. In still another embodiment, there is a maximum number of piggyback periods.

When packet processor 360 receives one or more data packets, it processes the data packet(s). In one embodiment, packet processor 360 processes the received data packet(s) in any conventional manner, as described above.

At any time, packet processor 360 may provide packets to packet queue storage 362 to be broadcast. When signaled, piggyback manager 364 determines whether there are one or more data packets in the packet queue in packet queue storage 362.

When piggyback manager 364 is signaled, piggyback manager 364 provides the one or more data packets from packet queue storage 362 to radio 340 and signals radio 340 to broadcast the one or more data packets. In one embodiment, piggyback manager 364 retrieves the one or more data packets from packet queue storage 362 using pointers to the head and tail of the queue. Radio 340 broadcasts as described above the one or more packets over the frequency, optionally using the address it received as described above. When radio 340 has finished broadcasting the one or more data packets, radio 340 signals piggyback manager 364. If the indication from packet receiver 354 indicates that one or more packets are received, piggyback manager 364 again signals packet receiver 354, which repeats the process as described above as many times as required, including signaling piggyback manager 364 with the indication as to whether one or more packets were received. If the indication indicates that no packets were received, and there are no packets to be sent from packet queue storage 364, piggyback manager 364 signals sleep manager 320 to initiate the sleep period and monitor the timer, repeating the process of receiving packets as described above.

In one embodiment, piggyback manager 364 will put the radio to sleep only after the end of the piggyback period, which it retrieves from initialization manager 312 or data packet manager 352, the piggyback period being measured from the date and time the last data packet was received or the date and time the radio was turned on but no packet was received. During such time, the radio may continue to receive piggybacked packets from other devices, of which there may be any number, and radio will provide such packets to packet receiver 354 for processing as described above. In one embodiment, piggyback manager 364 will put the radio to sleep no later than the end of the first piggyback period, even if additional packets are available to be sent by piggyback manager 364.

In one embodiment, following the end of any given sleep period, if energy identification manager 330 receives an energy level below the threshold, indicating that no packet is to be received, as described above, instead of signaling sleep manager 320, energy identification manager 330 signals packet transmission manager 370 to check the packet queue in packet queue storage 314 for any data packets. In the embodiment in which energy identification manager 330 is not used, instead of signaling sleep manager 320, chirp packet delimiter manager 350 signals packet transmission manager 370 to check the packet queue in packet queue storage 314 for any data packets, if chirp packet delimiter manager 370 receives the indication that no bits were received, or chirp packet delimiter manager 370 determines that the packet is not a chirp packet, or chirp packet delimiter manager 370 determines that the packet is not a chirp packet or data packet.

When packet transmission manager 370 receives the signal from energy identification manager 330, packet transmission manager 370 determines whether there are any packets in the packet queue in packet queue storage 362. If packet transmission manager 370 determines that there are no data packets in the packet queue in packet queue storage 362, packet transmission manager 370 signals sleep manager 320 to initiate the sleep period and repeat the process of receiving packets as described above. However, if packet transmission manager 370 identifies one or more data packets in packet queue storage 362, it signals chirp transmission manager 372.

When chirp transmission manager 372 receives the signal from packet transmission manager 370, chirp transmission manager 372 broadcasts a series of chirp packets as described above, each chirp packet containing a chirp packet delimiter and a different time to data packet from the chirp packet before it, in the manner described above. In one embodiment, chirp transmission manager 372 may initiate a time offset variable to zero, as described above, and store the offset variable internally. Chirp transmission manager 372 retrieves the sleep period from initialization manager 312, calculates time to data packet (which may be a countdown or countup time or a number of chirp packets remaining or sent), in the manner described above, and broadcasts each chirp packet containing the chirp packet delimiter and the time to data packet, incrementing (or decrementing) and storing the offset variable in the manner described above at each chirp broadcast, until the time to data packet has been reached or exceeded. When chirp transmission manager 372 determines that the time to data packet has been reached or exceeded, in the manner described above, it signals packet transmission manager 370 to broadcast the one or more data packets in packet queue storage 362.

When packet transmission manager 370 receives the signal from chirp transmission manager 372 to broadcast the one or more data packets in packet queue storage 362, packet transmission manager 370 provides the packet(s) in the packet queue in packet queue storage 362 to radio 340 and signals radio 340 to broadcast the one or more packets. When radio 340 has finished broadcasting the one or more packets, packet transmission manager 370 signals packet receiver 354 to repeat the process described above.

As described herein, communication via the radio is performed wirelessly. However, the present invention may also be used with other means of communication, such as wired communications or fiber optics over a conventional network. In such embodiment, a network interface may be used instead of, or in addition to, the radio.

What is claimed is:

1. A method for broadcasting a data packet in a network, the method comprising:

sending information from a first radio of a first network device to a second radio of a second network device, the information comprising a sleep period value and channel information;

generating instructions, in the second network device, for the second radio to monitor at least one frequency channel based on the channel information received from the first radio of the first device;

generating instructions, in the second network device, for the second radio to monitor communications received from at least one network address based on the channel information;

generating instructions, in the second network device, for the second radio to enter a sleep mode, the instructions for the sleep mode comprising:

information to reduce an amount of energy consumption of the second radio;

information to prevent the second radio from receiving a packet; and information to activate a counter involved in operations to calculate a first time period from when the second radio entered sleep mode;

generating instructions, in the second network device, for the second radio to identify an energy level based on the at least one frequency channel, the instructions to identify the energy level being related to a first time when the first time period is at least equal to the sleep period value;

generating instructions, in the second network device, to compare the energy level on the at least one frequency channel with a predetermined value;

generating instructions, in the second network device, for increasing the energy consumption of the second radio to enable the second radio to receive a first packet, when the value of the energy level on the at least one frequency channel is determined to be at least equal to the predetermined value;

generating instructions, in the second network device, for restarting the counter when the second radio determines that the value of the energy level is less than the predetermined value; and sending the generated instructions from the second device to the second radio.

2. The method of claim 1, additionally comprising generating instructions, in the second network device, for causing the second radio to at least attempt to broadcast an additional at least one packet when the value of the energy level on the at least one frequency channel is determined to be at least equal to the predetermined value.

3. The method of claim 1 further comprising:
generating instructions, in the second network device, for the second radio to be configured to receive a chirp packet as the first packet;
generating instructions, in the second network device, to determine, a second period of time associated with the broadcasting of a first data packet; and
generating instructions, in the second network device, for the second radio to enter the sleep mode upon receiving the chirp packet.

4. The method of claim 3 further comprising:
generating instructions, in the second network device, for increasing, when the second time period is at least equal to the value of the sleep period, the energy consumption of the second radio to enable the second radio receive a second packet; and
generating instructions, in the second network device, for the second radio to be configured to receive the data packet as the second packet.

5. The method of claim 3, wherein the chirp packet comprises information for a size of the first data packet.

6. The method of claim 5 further comprising:
determining, in the second network device, a third period of time from the chirp packet, the third period of time being associated with the broadcasting of the first data packet and the size of the first data packet.

7. The method of claim 6 further comprising:
generating instructions, in the second network device, for increasing, when the third time period is at least equal to the value of the sleep period, the energy consumption of the second radio to receive a second packet.

8. The method of claim 3, wherein the chirp packet comprises information on a total transmission time of the first data packet.

9. The method of claim 8 further comprising:
determining, in the second network device, a fourth period of time from the chirp packet, the third period of time associated with the broadcasting of a first data packet and the total transmission time of the first data packet.

10. The method of claim 9 further comprising:
generating instructions, in the second network device, for increasing, when the fourth time period is at least equal to the value of the sleep period, the energy consumption of the second radio to receive a second packet.

11. The method of claim 3, wherein the chirp packet comprises at least a second data packet.

12. The method of claim 1 further comprising:
generating instructions, in the second network device, for the second radio to be configured to receive a data packet as the first packet.

13. The method of claim 12 further comprising:
generating instructions, in the second network device, for the second radio to broadcast a second data packet in the at least one frequency channel.

14. A method for broadcasting a data packet in a network, the method comprising:
receiving, at a second radio of a second network device, information from a first radio of a first network device, the information comprising a sleep period value and channel information;
receiving, at the second radio, instructions from the second network device to monitor at least one frequency channel based on the channel information received from the first radio of the first network device;
receiving, at the second radio, instructions from the second network device to monitor communications received from at least one network address based on the channel information;
monitoring the at least one frequency channel based on the channel information received;
monitoring the communications received from the at least one network address based on the channel information;
receiving, at the second radio, instructions from the second network device to enter a sleep mode, the instructions for the sleep mode comprising:
information to reduce an amount of energy consumption of the second radio;
information to prevent the second radio from receiving a packet; and
information to activate a counter involved in operations to calculate a first time period from when the second radio entered sleep mode;
receiving, at the second radio, instructions from the second network device to identify an energy level based on the at least one frequency channel, the instructions to identify the energy level being related to a first time when the first time period is at least equal to the sleep period value;
identifying the energy level based on the instructions received from the second network device;
receiving, at the second radio, instructions from the second network device, to compare the energy level on the at least one frequency channel with a predetermined value;
computing the energy level on the at least one frequency channel based on the instructions received from the second network device;
receiving, at the second radio, instructions from the second network device, for increasing the energy consumption of the second radio to enable the second radio to receive a first packet, when the value of the energy level on the at least one frequency channel is determined to be at least equal to the predetermined value;
determine, based on the instructions received from the second network device, whether to increase the energy consumption of the second radio when the value of the energy level on the at least one frequency channel is determined to be at least equal to the predetermined value;
increasing the energy consumption of the second radio based on the determination; and
receiving, at the second radio, instructions from the second network device, for restarting the counter when the second radio determines that the value of the energy level is less than the predetermined value.

15. A non-transitory computer-readable medium for broadcasting a data packet in a network, the non-transitory computer-readable medium comprising instructions to cause a computer to perform operations comprising:
receiving information from a first radio to a second radio, the information comprising a sleep period value and channel information;
generating, with at least one processor, instructions for the second radio to monitor at least one frequency channel based on the channel information received from the first radio;
generating, with at least one processor, instructions for the second radio to monitor communications received from at least one network address based on the channel information;
generating, with at least one processor, instructions for the second radio to enter a sleep mode, the instructions for the sleep mode comprising:

information to reduce an amount of energy consumption of the second radio;

information to prevent the second radio from receiving a packet; and information to activate a counter involved in operations to calculate a first time period from when the second radio entered sleep mode;

generating instructions for the second radio to identify an energy level based on the at least one frequency channel, the instructions to identify the energy level being related to a first time when the first time period is at least equal to the sleep period value;

generating instructions to compare the energy level on the at least one frequency channel with a predetermined value;

generating instructions for increasing the energy consumption of the second radio to enable the second radio to receive a first packet, when the value of the energy level on the at least one frequency channel is determined to be at least equal to the predetermined value;

generating instructions for restarting the counter when the second radio determines that the value of the energy level is less than the predetermined value; and sending the generated instructions from the at least one processor to the second radio.

16. The non-transitory computer-readable medium of claim 15, additionally comprising instructions to cause a computer to perform operations to generate instructions, in the second network device, for causing the second radio to at least attempt to broadcast an additional at least one packet when the value of the energy level on the at least one frequency channel is determined to be at least equal to the predetermined value.

17. A system for broadcasting a data packet in a network, the system comprising:

a radio electrically connected to a network device and wirelessly with a network, the radio being configured to:

receive, from the network, a sleep period value and channel information;

receive, from the network device, control instructions; and send, to the network device, the sleep period value and the channel information received from the network; and the network device connected to the radio, the network device configured to:

generate instructions for the radio to monitor at least one frequency channel based on the channel information received;

generate instructions for the radio to monitor communications received from at least one network address based on the channel information;

generate instructions for the radio to enter a sleep mode, the instructions for the sleep mode comprising:

information to reduce an amount of energy consumption of the second radio;

information to prevent the second radio from receiving a packet; and information to activate a counter involved in operations to calculate a first time period from when the second radio entered sleep mode;

generate instructions for the radio to identify an energy level based on the at least one frequency channel, the instructions to identify the energy level being related to a first time when the first time period is at least equal to the sleep period value;

generate instructions to compare the energy level on the at least one frequency channel with a predetermined value;

generate instructions for increasing the energy consumption of the second radio to enable the radio to receive a first packet, when the value of the energy level on the at least one frequency channel is determined to be at least equal to the predetermined value;

generate instructions for restarting the counter when the radio determines that the value of the energy level is less than the predetermined value; and send the generated instructions to the radio.

\* \* \* \* \*